US010776806B2

(12) United States Patent
Laiderman

(10) Patent No.: US 10,776,806 B2
(45) Date of Patent: Sep. 15, 2020

(54) MOBILE LOYALTY SYSTEM AND METHOD

(71) Applicant: David Laiderman, Baltimore, MD (US)

(72) Inventor: David Laiderman, Baltimore, MD (US)

( * ) Notice: Subject to any disclaimer, the term of this patent is extended or adjusted under 35 U.S.C. 154(b) by 378 days.

(21) Appl. No.: 13/777,682

(22) Filed: Feb. 26, 2013

(65) Prior Publication Data

US 2014/0244373 A1     Aug. 28, 2014

(51) Int. Cl.
*G06Q 30/02* (2012.01)

(52) U.S. Cl.
CPC ................. *G06Q 30/0225* (2013.01)

(58) Field of Classification Search
CPC ................................................ G06Q 30/0225
USPC .......... 705/14.58, 14.26, 14.15, 14.16, 14.33
See application file for complete search history.

(56) References Cited

U.S. PATENT DOCUMENTS

| 2004/0243468 | A1 | 12/2004 | Cohagan et al. |
| 2010/0106570 | A1 | 4/2010 | Radu et al. |
| 2011/0028160 | A1 | 2/2011 | Roeding et al. |
| 2011/0264490 | A1 | 10/2011 | Durvasula et al. |
| 2011/0307318 | A1* | 12/2011 | LaPorte ............... G06Q 20/209 705/14.33 |
| 2012/0004968 | A1 | 1/2012 | Satyavolu et al. |
| 2012/0072271 | A1 | 3/2012 | Dessert et al. |
| 2012/0095822 | A1* | 4/2012 | Chiocchi .................... 705/14.26 |
| 2013/0080225 | A1* | 3/2013 | Rajaram ............... G06Q 50/01 705/14.16 |
| 2013/0282490 | A1* | 10/2013 | Kramer .................. G06Q 30/02 705/14.58 |

FOREIGN PATENT DOCUMENTS

EP         1820581 A1 *    8/2007    ....... A61B 17/06066

OTHER PUBLICATIONS

Louise O'Brien and Charles Jones, 1995, Do Rewards Really Create Loyalty? (Year: 1995).*

* cited by examiner

*Primary Examiner* — Tarek Elchanti
(74) *Attorney, Agent, or Firm* — David H. Chervitz

(57) ABSTRACT

A mobile loyalty system for preventing fraudulent redemption of a reward is disclosed which comprises a mobile communication device having a screen and configured to run a mobile application for obtaining a code representative of a visit to a merchant, the mobile application for transmitting information associated with obtaining the code representative of the visit to the merchant and for receiving information associated with a reward to be redeemed at the merchant, the screen for displaying the reward to be redeemed and a motion element for preventing fraudulent redemption of the reward.

20 Claims, 7 Drawing Sheets

MOBILE LOYALTY SYSTEM AND METHOD

BACKGROUND

This disclosure relates to a system and method for implementing a customer loyalty program and more particularly to a system and method for implementing a mobile loyalty program through the use of a cellphone, smart phone, or other telecommunications device that prevents fraudulent redemption of a reward.

Customer loyalty programs are used by merchants and businesses to retain customers. It is typically less expensive to retain a customer than to attempt to attract a new customer. Some examples of the types of loyalty programs established by merchants require a customer to have a punch card, a gift card, or a debit-type card. Every time a customer visits the merchant and makes a purchase the card will be credited for the purchase. However, such programs have problems in that the customer must always remember to bring the card to the merchant when a new purchase is being transacted. If the customer forgets to bring the card then some loyalty programs allow the customer to enter the transaction via the Internet. However, the customer must take the time to enter the information. Forgetting or losing the card and not being credited for the purchase may have an adverse impact on the customer and the loyalty program.

Another type of loyalty program consists of a coupon being printing on the back of a receipt of a customer. For example, a grocery store will print out a coupon that requires the customer to return to the store to use the coupon on another purchase. However, this type of loyalty program requires the customer to remember about the coupon and to bring the coupon back to the grocery store. If the coupon is not used this may defeat the whole purpose for the loyalty program.

In order to avoid some of the problems associated with these loyalty program, one loyalty program that has been suggested uses a smart phone or other mobile device to interact with a computerized loyalty system. In the proposed system, a customer downloads a loyalty program application onto the smart phone and uses the application to join the loyalty program and to interact with the loyalty program. When a customer enters into a transaction at a merchant that is running the loyalty program, a code image, such as an QR (Quick Response) code is generated for the particular customer to use to record a credit in the loyalty program. The QR code must be generated for each customer for each transaction. Once the QR code is generated the QR code may be photographed or scanned by the smart phone and this code may be sent to a loyalty system server associated with the merchant. The loyalty system server uses the transmitted information to credit the account of the customer. Although such a system may be useful, one problem associated with its use is that there is no fraud prevention mechanism available or built into the system to prevent multiple redemption of a single reward.

Therefore, it would be desirable to have a mobile loyalty system that prevents fraudulent redemption of a reward. For example, it would be advantageous to have a mobile loyalty system that prevents fraudulent redemption of a reward being offered by a merchant by alerting the merchant that the reward has been redeemed. It would also be advantageous to have a mobile loyalty system that does not require the generation of QR codes for each individual customer for each individual transaction.

SUMMARY

In one form of the present disclosure, a mobile loyalty system for preventing fraudulent redemption of a reward is disclosed which comprises a mobile communication device having a screen and configured to run a mobile application for obtaining a code representative of a visit to a merchant, the mobile application for transmitting information associated with obtaining the code representative of the visit to the merchant and for receiving information associated with a reward to be redeemed at the merchant, the screen for displaying the reward to be redeemed and a motion element for preventing fraudulent redemption of the reward.

In another form of the present disclosure, a mobile loyalty system comprises a mobile communication device having a screen and configured to run a mobile application for obtaining a code representative of a visit to a grouping of merchants, the mobile application for transmitting information associated with obtaining the code representative of the visit to one of the merchants within the grouping of merchants and for receiving information associated with a reward to be redeemed at any of the merchants within the grouping of merchants, the screen for displaying the reward to be redeemed and a motion element for preventing fraudulent redemption of the reward.

In yet another form of the present disclosure, a method for conducting a mobile loyalty system comprises the steps of enrolling in a mobile loyalty system, visiting a merchant that has the mobile loyalty system, scanning a code located at the merchant to indicate that the merchant was visited and to obtain a credit toward a reward to be offered by the merchant, accumulating a predetermined number of credits to obtain a reward to be redeemed, receiving a notification that the reward is redeemable, and displaying a motion element that indicates that the reward must be redeemed in a predetermined period.

In light of the foregoing comments, it will be recognized that the present disclosure provides a system and method for implementing a mobile loyalty program that prevents fraudulent redemption of a reward.

The present disclosure provides a system and method for implementing a mobile loyalty program in which a reward must be redeemed within a certain time limit.

The present disclosure provides a system and method for implementing a mobile loyalty program in which a reward may only be redeemed in a certain geographical area.

The present disclosure provides a system and method for implementing a mobile loyalty program in which a reward may be redeemed at a grouping of associated merchants or stores.

The present disclosure provides a mobile loyalty system that enables a customer of a merchant to use a smart phone or other mobile device to easily participate in the mobile loyalty program that prevents fraudulent redemption of a reward.

These and other advantages of the present system and method for implementing a mobile loyalty program will become apparent after considering the following detailed specification in conjunction with the accompanying drawings, wherein:

DETAILED DESCRIPTION OF THE PREFERRED EMBODIMENTS

Figure 1:
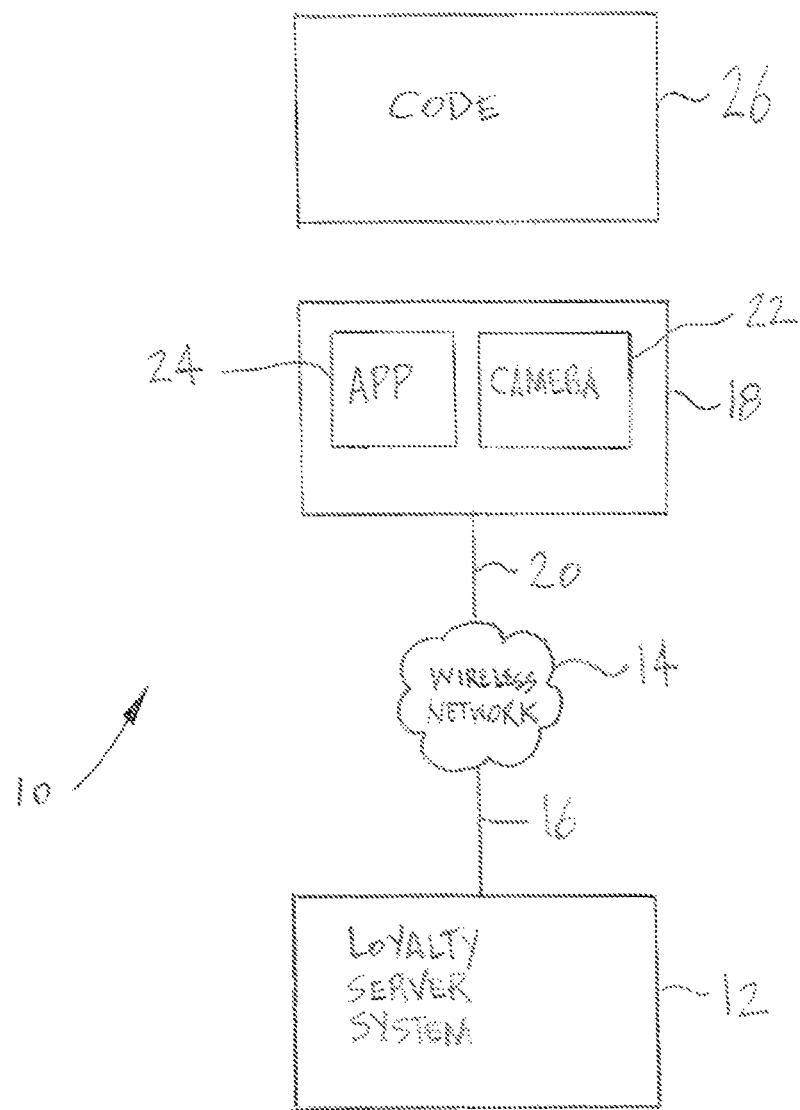
FIG. 1 is a block diagram of a mobile loyalty system constructed according to the present disclosure.

Referring now to the drawings, wherein like numbers refer to like items, number 10 identifies a mobile loyalty reward system constructed according to the present disclosure. With reference now to FIG. 1, the system 10 is shown to comprise a loyalty server system 12 that is connected to a communications network such as the Internet 14 via a connection 16. The server system 12 may comprise a computer network that is capable of storing software programs and data. The server system 12 may comprise a single computer system or a number of computer systems grouped together. By way of example, the computer 12 may be a computer having a microprocessor, memory, a hard drive having stored thereon an operating system and other software, input devices such as a mouse, a CD-ROM drive, and a floppy disk drive. Other ancillary devices may be included such as a printer, a scanner, a modem, a router, or other network devices that allow the loyalty server system 12 to be connected to the Internet 14. The connection 16 may take on various forms such as a telephone line, cable, ISDN lines, fiber optic lines, wireless connections, microwave, radio, satellites, or other connection devices or means.

A customer mobile device 18 is also capable of being connected to the Internet 14 by a connection 20. The connection 20 may take on the same form or forms as the connection 16, but is typically a wireless connection or a WiFi connection. The customer mobile device 18 has a camera 22 and the capability of having a program such as an application 24 resident in the device 18. The application 24 allows the camera 22 to capture an image, such as a loyalty code 26, for processing the code 26. The code 26 may be on a display at a merchant site, as will be discussed herein. The application 24 may be downloaded to the device 18 by the camera 22 capturing another image or code, through the use of a generic QR code reader application already resident on the device 18, that directs this application on the device 18 to a website to download the application 24 or by visiting a merchant website and downloading the application 24. The application 24 may require the customer to fill out various registration screens by inputting information through the device 18. The code 26 is a loyalty code which provides for various loyalty products or services to be rewarded to the user of the device 18. The customer mobile device 18 may be a smart phone, an iPod touch, a personal digital assistant (PDA), an iPad, tablet, device that has WiFi connectivity, or other mobile communications device capable of sending and receiving data over a wireless network.

Once the registration of the application with the merchant is completed, the customer may photograph the loyalty code 26 by use of the application 24 and the camera 22. The customer must perform this step at the merchant's store. The code 26 is transmitted to the loyalty server system 12 via the wireless network 14. The loyalty server system 12 manages the mobile loyalty system 10 and will credit the customer's account with a loyalty visit once the code 26 is received. As can be appreciated, the loyalty code 26 is used to track or credit a visit and it may not be necessary for a transaction or a purchase to occur at any visit.

The customer mobile device 18 operates on a mobile software platform such as iPhone OS (Operating System), Android OS, Palm WebOS, Windows Mobile, or other similar mobile software platform. The camera 22 is capable of capturing the code 26 and is controlled by software installed on the device 18. The code 26 captured by the camera 22 is decoded for use by the application 24. For example, if the code 26 is an QR code then this code will be decoded into a digital form to be used by the application 24. This decoded information may be encoded or encrypted by the application 24 and then submitted to the loyalty service system 12 via the wireless network 12.

As previously indicated, the loyalty code 26 is a QR code that may be displayed on a placard near a register or at various other locations within a merchant's store or premises. A customer may enter a merchant's store and photograph the code 26 with the use of the device 18. However, due to the fraud prevention elements of the mobile loyalty system 10 and as will be explained further herein, the photographing or scanning of the code 26 to obtain a credit for a visit is limited. Although a QR code has been disclosed, it is also possible to use other codes that may be scanned or photographed by the device 18. By way of example only, another such code is a bar code or any other code that has information or data embedded therein. The loyalty code 26 may contain information or data such as a string of alphanumeric data may be in the form of a web address or a Uniform Resource Identifier (URI). The string of alphanumeric data may include the location of the merchant or a grouping of merchants, as will be discussed further herein.

The mobile loyalty system 10 has fraud prevention elements incorporated therein which comprise the ability to indicate to the customer when a reward is available, at which merchant location a reward is available, or at which locations of a merchant or a group of merchants a reward is available. In particular, once a reward is available, a customer will be notified or alerted that a reward has been earned and will be provided an indication as to when the reward will expire. This notification may be shown to the merchant and the reward will be granted or provided to the customer. This notification and the fraud prevention element will be discussed more fully herein. The customer may also be notified of the reward and will be provided an indication as to where the reward may be redeemed. Further, the customer may also be notified that a reward has been earned and will be provided an indication as to what merchant or group of merchants will honor the reward.

Figure 2:
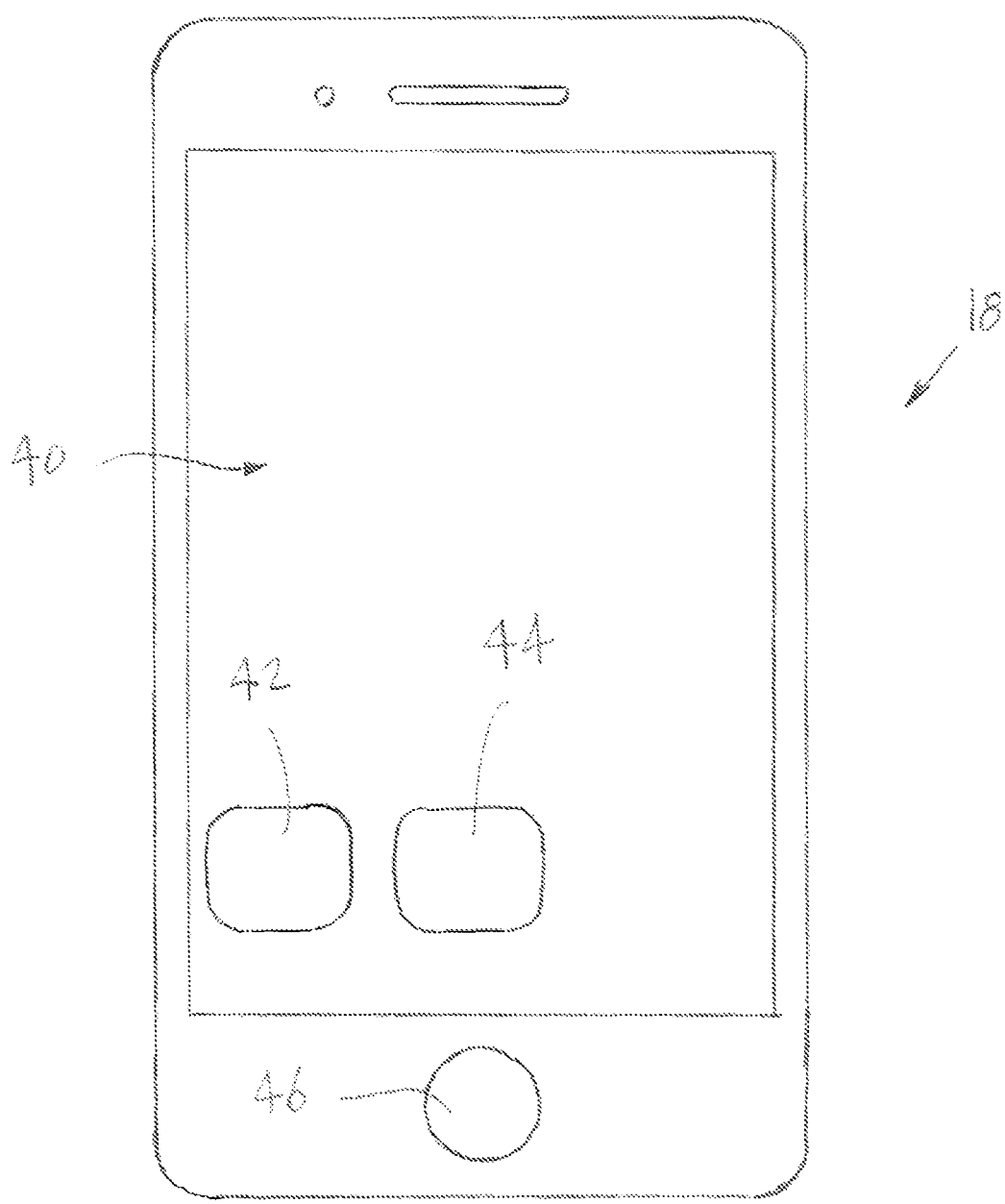
FIG. 2 is an illustration of a screen which may be presented during use of the mobile loyalty program constructed according to the present disclosure.

FIG. 2 illustrates a screen 40 that may be displayed on the device 18 that has installed therein the application 24. The screen 40 has an icon or button 42 that may be pressed to open the application 24. The icon 42 indicates that the application 24 has been installed on the device 18. The screen 40 also has one or more icons or buttons 44 that may be operated to open other applications resident in the device 18. For example, the icon 44 may be pressed to open a screen to dial a phone number. Once the icon 42 is pressed or selected another screen will open which will allow the customer to operate the application 24. The device 18 may have other switches or selection devices that may be pressed to operate the device 18, such as the button 46.

Figure 3:
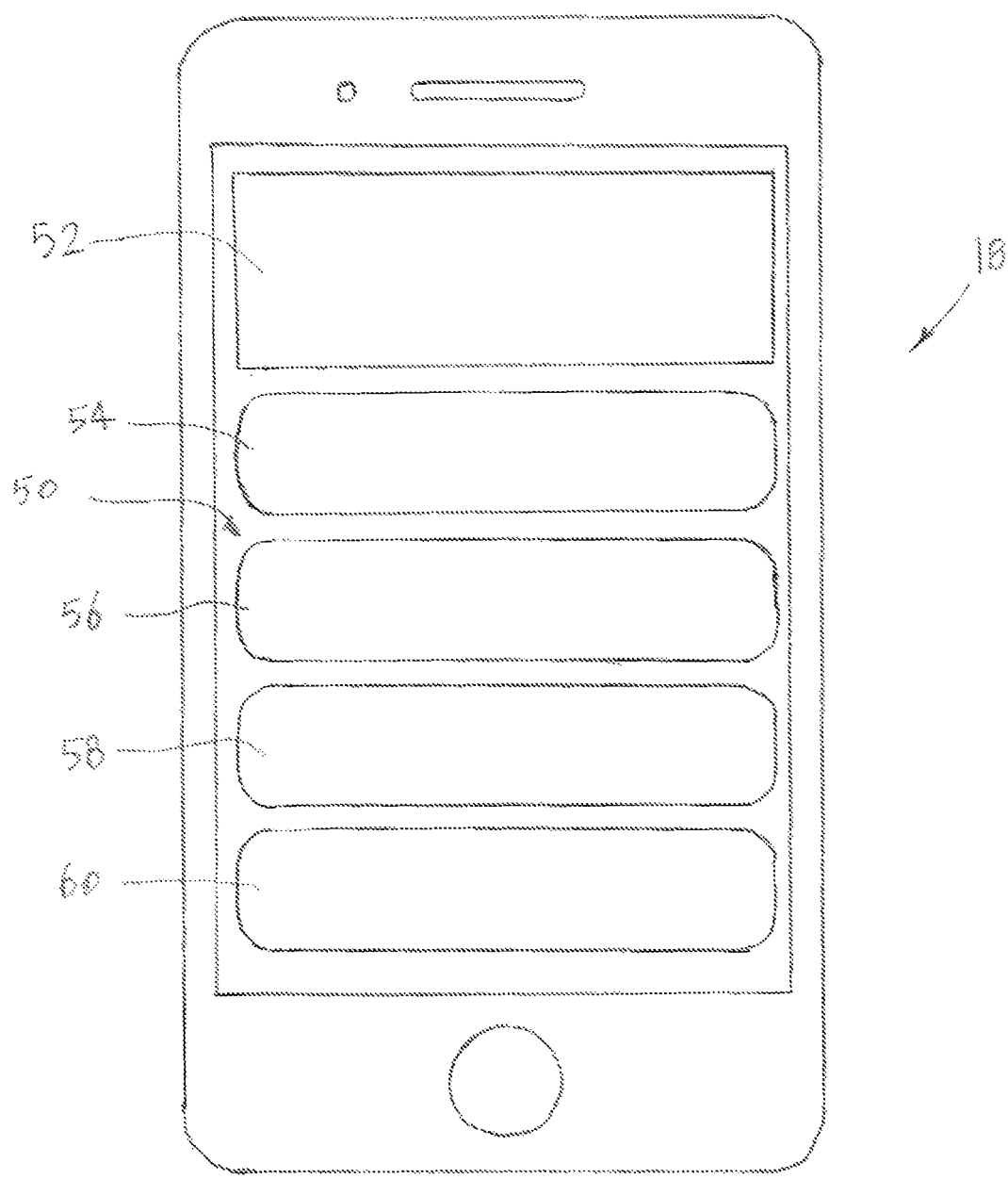
FIG. 3 is an illustration of a screen which may be presented during use of the mobile loyalty system constructed according to the present disclosure.

With reference now to FIG. 3, a screen 50 is shown which is displayed to the customer once the customer has selected the icon 42. The screen 50 may include an icon 52 that may be pressed by the customer to scan an QR code to log a visit or purchase at a merchant's store. The icon 52 may be linked to an internal QR code scanner program or application resident in the device 18. The icon 52 may include a logo or a message, such as an instruction, to identify the use of the icon 52. For example, the logo or trademark of the merchant may be displayed in the icon 52. Also, a message such as "Push To Scan & Log Your Visit" may be placed in the icon 52 to instruct the customer. The screen 50 may include other icons, such as icons 54, 56, 58, and 60. The icon 54 may be used to hyperlink the customer to a merchant's customized mobile ordering menu to order in advance of visiting the merchant's store or establishment. The icon 56 may be used to provide a list of deals or coupons that are available at local franchises, the distance from each location, and an opportunity to redeem each deal or coupon. The icon 58 may be available to provide an exclusive offer to the customer and allow for an incentive reward to be offered for scanning the QR code for the first time. The icon 60 may be provided to indicate if a reward is available to the customer who has joined a loyalty program being offered by the merchant. As can be appreciated, the icons 54, 56, 58, and 60 may be programmed for other uses or applications.

Figure 4:
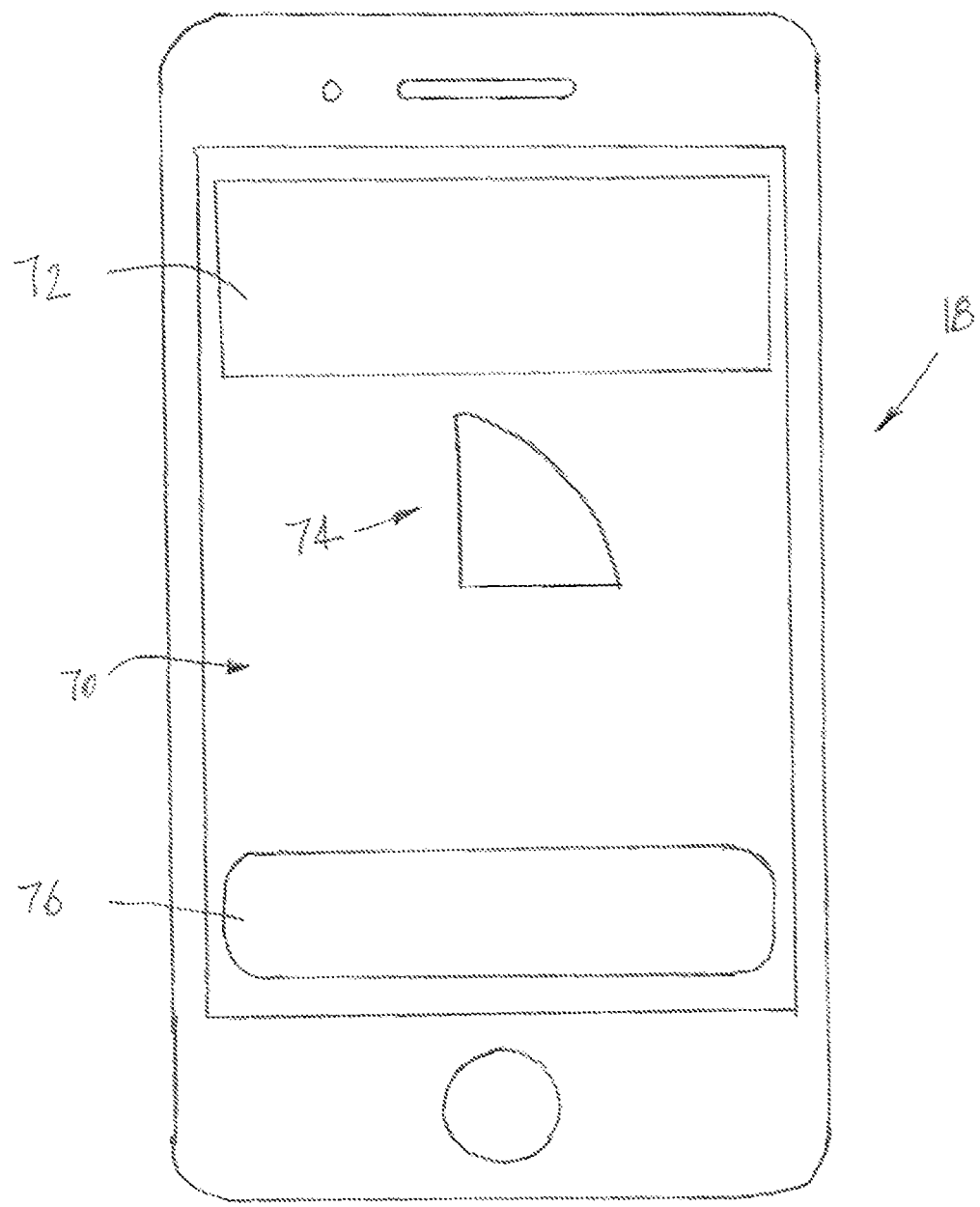
FIG. 4 is an illustration of a screen which may be presented during use of the mobile loyalty system constructed according to the present disclosure.

FIG. 4 depicts a screen 70 that may be displayed to the customer when the customer has selected the icon 60. The screen 70 may include a box 72 that may display a message that indicates that a reward has been earned by the customer who is a member of a loyalty program being offered by the merchant. For example, once a customer has visited a merchant a preset number of times, whether or not a purchase has been made, and the customer has scanned the QR code, the customer will be offered a reward. The box will include information about the reward being offered and when the reward has to be redeemed. The screen 70 also has fraud protection device 74, such as a box, or an icon, or a display element. The fraud protection device 74 is shown as a quarter of an hour display. The device 74 is also displayed in a transitory format in that the device 74 will be blinking, flashing, or moving. In this manner, the customer may show the screen 70 to the merchant to indicate that the reward has been earned and that the device 74 is moving, flashing, or blinking to indicate that the reward has not yet been redeemed. If the reward is not redeemed within this time period then the device 74 will time out and will not longer be displayed. For example, although the device 74 has been shown to be a quarter of an hour other time periods are possible and contemplated. In this particular example, the device 74 will count down and the reward has to be redeemed in fifteen minutes or the reward is forfeited. The device 74 may also include a digital clock component that will count down from fifteen minutes to zero minutes. Once the digital clock counts down to zero the device 74 will no longer be moving, flashing, or blinking. This will indicate to both the customer and the merchant that the reward was not redeemed and the time period for redemption has expired. It is also possible that the device 74 will disappear from the screen 70 to indicate to the customer that the reward is no longer available to be redeemed. The screen 70 may also include an icon or box 76 that may be pressed or selected by the customer or merchant to indicate that the reward has been redeemed. For example, when the customer shows the screen 70 to the merchant, the merchant will see the reward being offered in the box 72. The merchant may then provide the reward to the customer and request that the customer press the box 76 which will either stop or disable the device 74 from moving or delete the device 74 from the screen 70.

With the use of the device 74, fraudulent redemption of a reward is prevented. It is also contemplated that the device 74 will blink, flash, or move in a predetermined sequence or rate or a random sequence or rate to further prevent a fraudulent redemption of a reward. For example, the device 74 may flash on for two seconds then flash off for one second in a continuous manner until either the reward is redeemed or the time period set for redemption has expired. Further, it is possible that the entire screen 70 may move, blink, flash, scroll, or crawl to indicate that a reward redemption period is active.

Figure 5:
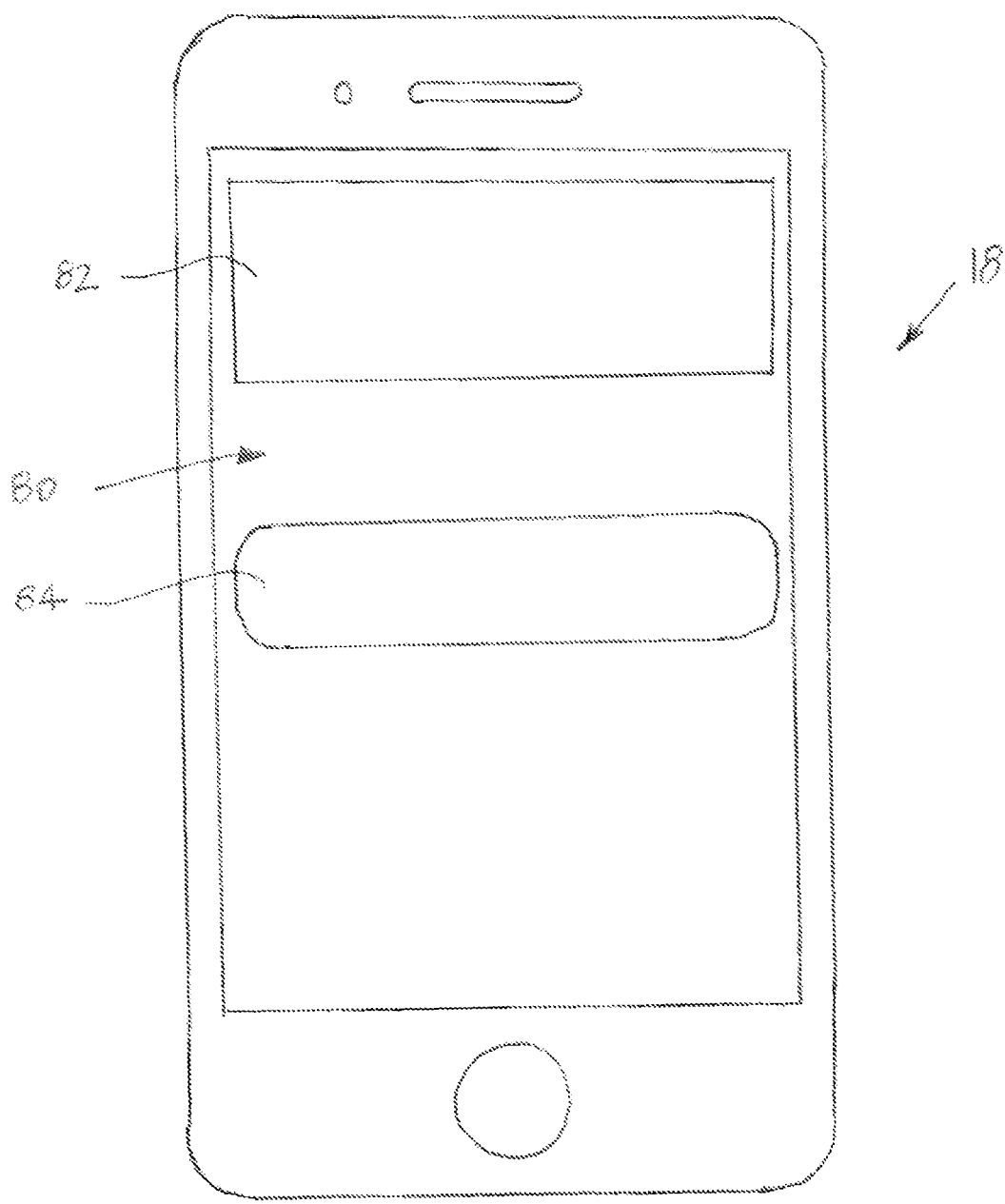
FIG. 5 is an illustration of a screen which may be presented during use of the mobile loyalty system constructed according to the present disclosure.

With reference now to FIG. 5, a screen 80 is shown that may be displayed to the customer when the customer has selected the icon 60 depicted in FIG. 3. The screen 80 includes a box 82 that may display a message that indicates that a reward has been earned by the customer who is a member of a loyalty program being offered by the merchant. The screen 80 also has fraud protection device 84, such as a box, or an icon, or a display element. The fraud protection device 84 is displayed in a transitory format in that the device 84 will be blinking, flashing, or moving. In this manner, the customer may show the screen 80 to the merchant to indicate that the reward has been earned and that the device 84 is moving, flashing, or blinking to indicate that the reward has not yet been redeemed. It is also possible that the device 84 will scroll or crawl across the screen 80 in a continuous manner. Within the device 84 may be displayed an expiration message. The expiration message will indicate to the customer when the reward shown in the box 82 must be redeemed or the reward will expire. The device 84 also functions to indicate that the reward has been redeemed in that the device 84 may be pressed by the customer or the merchant to indicate redemption of the reward. For example, the customer shows the screen 80 to the merchant, the merchant will see the reward being offered in the box 82. The merchant may then provide the reward to the customer and request that the customer press the box 84 which will either stop or disable the device 84 from moving or delete the device 84 from the screen 80. With the use of the device 84, fraudulent redemption of a reward is prevented. It is also contemplated that the device 84 will blink, flash, scroll, or move in a predetermined sequence or a random sequence to further prevent a fraudulent redemption of a reward. Although only the boxes 82 and 84 were shown in the screen 80 it is also possible that other boxes may be displayed in the screen 80. Further, it is possible that the entire screen 80 may move, blink, flash, scroll, or crawl to indicate that a reward redemption period is active.

Figure 6:
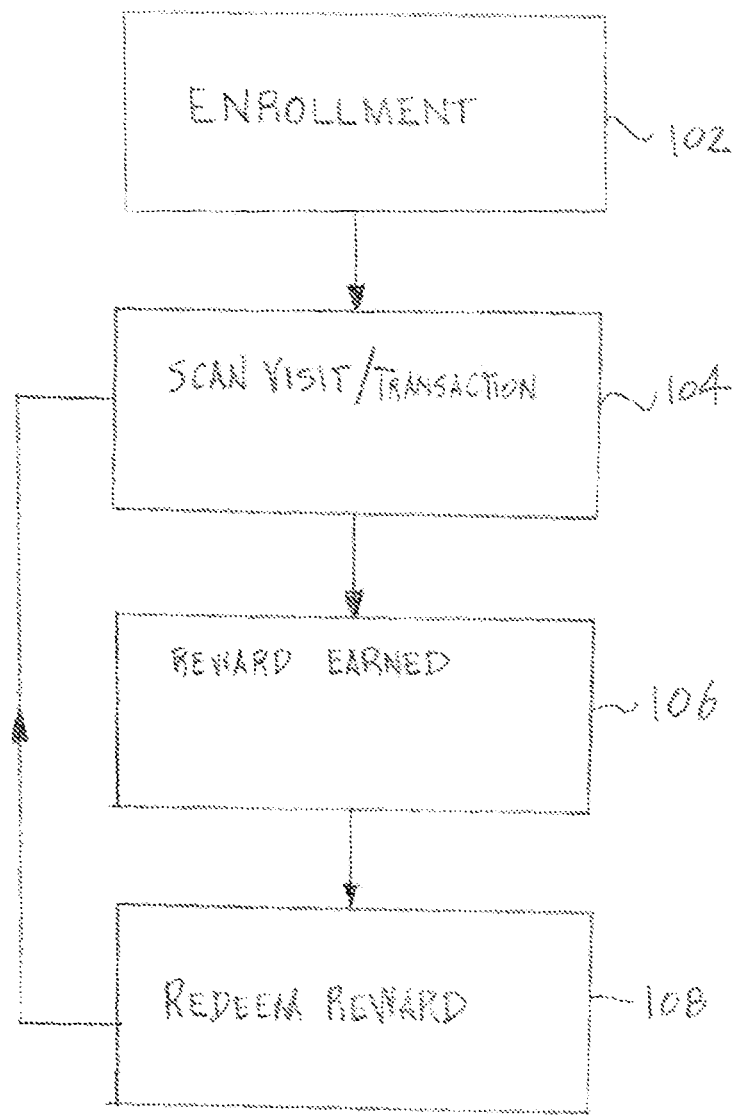
FIG. 6 is a flow chart diagram of an operation of a mobile loyalty system of the present disclosure.

FIG. 6 is a flow chart diagram 100 of the general operation of the system 10. In an initial step 102, a customer will enroll in a loyalty program being offered by a merchant. The customer may enroll in the loyalty program by various methods. For example, the customer may see an ad in a magazine or at a website that the merchant is offering the loyalty program and the customer will be directed to a website to enroll in the loyalty program. The merchant may also have a sign in the merchant's store with the sign having an QR code 26 that the customer may scan by use of the customer's device 18 to be directed to a website to enroll in the loyalty program. The enrollment process may include the customer entering information such as the customer's name, email address, and a password. The enrollment process does not require that the customer be at the merchant's site or store. Once the customer has enrolled in the loyalty program the customer may begin to use the loyalty program. The merchant may offer a reward for enrolling in the loyalty program. In a next step 104, a customer will scan a visit or a transaction by use of the customer's device 18. The merchant may have a sign or a number of signs in the merchant's store for the customer to scan. For example, a sign having the QR code 26 on it may be placed on every table of a restaurant. Although a transaction is preferred, a transaction is not required to accumulate a reward. The customer may be credited for a visit to the merchant's store without having to complete a transaction or purchase. However, the application 24 will only allow a credit for a predetermined time period. For example, the customer may scan the QR code 26 numerous times during a visit, but the customer's loyalty program account will only be credited for a single visit. The system 10 may limit the customer to a single credit for a predetermined time period. For example, the customer may only be able to obtain a credit for a twenty-four hour time period. In this manner, the customer may visit the merchant's store on a Monday and scan the QR code 26 to obtain a credit for the visit on Monday and then visit the merchant's store on a Wednesday and scan the QR code 26 to obtain another credit for the visit on Wednesday. If the customer were to visit the merchant's store twice on Monday and scan the QR code 26 twice then the customer may only receive credit for a single visit due to the time limit imposed by the system 10. It is also possible that the system 10 may include a shorter time limit, such as four hours between being able to scan a visit, or a longer time limit. Some merchants may require that a transaction or purchase be made in order to obtain a credit. In this case, it is contemplated that the QR code 26 will be printed on the receipt and the customer may scan the QR code 26 on the receipt. The mobile device 18 sends the decoded transaction information from the QR code 26 and customer authentication information to the loyalty server system 12 which uses this information to credit a loyalty program account of the customer.

In a next step 106, the customer has accumulated enough credits to earn a reward. The customer is notified of the reward when the customer presses icon 60 and is presented with either the screen 70 or the screen 80. It is also possible that the customer will be sent an email to alert the customer that a reward has been earned and is available for redemption. Once the reward has been earned, in a next step 108, the customer visits the merchant's store and presents either the screen 70 or the screen 80 to the merchant. The merchant will be able to view the reward earned and that the reward has not been previously redeemed by viewing the movement of the device 74 or the device 84. Once the reward has been delivered or redeemed, the box 76 or the device 84 may be pressed. The customer may begin to accumulate other credits to obtain another reward by returning to the step 104 where the customer may scan the QR code at the next visit to the merchant's store.

Figure 7:
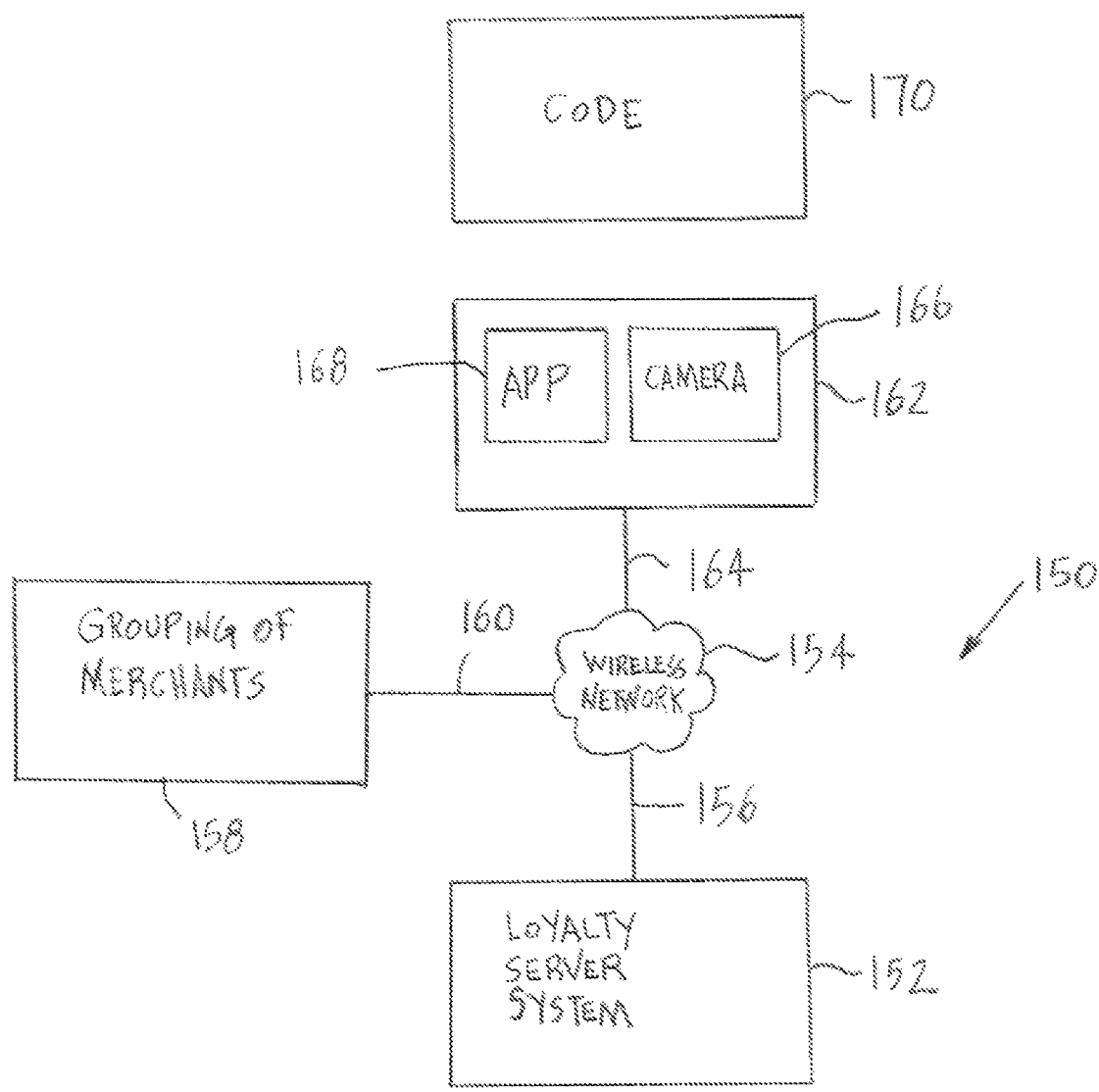
FIG. 7 is a block diagram of another embodiment of a mobile loyalty system constructed according to the present disclosure.

Referring now to FIG. 7, a mobile loyalty system 150 is shown comprising a loyalty server system 152 that is connected to a communications network such as the Internet 154 via a connection 156. A grouping of merchants 158 may be connected to the communications network 154 via a wireless connection 160. Although a wireless connection 160 is shown, it is also possible that the grouping of merchants 158 may be connected to the loyalty server system 152 by other connections such as a wireless network connection, a local area network, a wide area network, or a gateway. The grouping of merchants 158 may, by way of example only, be a franchisee that has multiple locations in a geographical area. Each location may be part of the mobile loyalty system 150. A customer mobile device 162 is also capable of being connected to the Internet 154 by a wireless connection 164. The customer mobile device 162 has a camera 166 and the capability of having a program such as an application 168 resident in the device 162. The application 168 can control operation of the camera 166 to capture an image, such as a loyalty code 170, for processing the code 170. The code 170 may be on a display at every location of the grouping of merchants 158. The application 168 may be downloaded to the device 162 by the camera 166 capturing another image or code, through the use of a generic QR code reader or scanner application already resident on the device 162, that directs this application on the device 162 to a website to download the application 168 or by visiting a merchant website and downloading the application 168. The application 168 may require the customer to fill out various registration screens by inputting information through the device 162. The code 170 is a loyalty code which provides for various loyalty products or services to be rewarded to the user of the device 162. As has been previously indicated, the customer mobile device 162 may be a smart phone, an iPod touch, a personal digital assistant (PDA), an iPad, tablet, device that has WiFi connectivity, or other mobile communications device capable of sending and receiving data over a wireless network.

Once the registration of the application 168 with the grouping of merchants 158 is completed, the customer may photograph or scan the loyalty code 170 by use of the application 168 and the camera 166 at any of the locations of the grouping of merchants 158. The customer must perform this step at any of the locations the grouping of merchants 158. The code 170 is transmitted to the loyalty server system 152 via the wireless network 154. The loyalty server system 152 manages the mobile loyalty system 150 for the grouping of merchants 158 and will credit the customer's account with a loyalty visit once the code 170 is received. As can be appreciated, the loyalty code 170 is used to track or credit a visit or transaction and it may not be necessary for a transaction or a purchase to occur at any visit to receive a credit.

The mobile loyalty system 150 has fraud prevention elements incorporated therein which comprise the ability to indicate to the customer when a reward is available, at which merchant location a reward is available, or at which locations of a merchant or a group of merchants a reward is available. In particular, once a reward is available, a customer will be notified or alerted that a reward has been earned and will be provided an indication as to when the reward will expire. This notification may be shown at one of the locations within the grouping of merchants 158 and the reward will be granted or provided to the customer. The customer may also be notified of the reward and will be provided an indication as to where the reward may be redeemed.

The loyalty mobile system 150 has a fraud prevention feature incorporated into the application 166. The fraud prevention feature is the same as has been described with respect to the screen 70 or the screen 80. In particular, the fraud prevention feature is displayed in a transitory format on a screen of the device 162 that will be blinking, flashing, or moving. In this manner, the customer may show the screen to the merchant at any of the locations within the grouping of merchants 158 to indicate that the reward has been earned and needs to be redeemed within a certain time limit.

In operation of the mobile loyalty system 150, the customer once enrolled in the system 150 will be able to accumulate credits toward a reward at multiple locations of a merchant within the grouping of merchants 158. For example, a grouping of merchants 158 may include several of the same restaurants located at various diverse locations. One location may be close to the customer's house and another location may be near the customer's office. The customer may visit the location near the customer's house on one day and obtain a credit and the customer may visit the location near the customer's office on another day and obtain another credit toward a reward. In this manner, the customer is loyal to the grouping of merchants 158 and not to one particular location. It is also possible that different stores, such as different restaurants, may be within the grouping of merchants 158. For example, the customer may earn a reward and the merchant may provide the reward at a location that is under performing to drive traffic to the under performing location.

As can be appreciated, loyalty server system 12 or 152 may be implemented by use of one or more servers or other computers. The servers 12 or 152 may be located at the location of the merchant's store, or at one of the locations of the grouping of merchants 158, or at a remote location. The loyalty server system 12 or 152 may include a database for storing customer account information for customers that enroll in the mobile loyalty system 10 or 150. The database may contain information such as customer name, password, phone number, email address, house address, and accumulated credits.

From all that has been said, it will be clear that there has thus been shown and described herein a mobile loyalty system and method which fulfills the various advantages sought therefore. It will become apparent to those skilled in the art, however, that many changes, modifications, variations, and other uses and applications of the subject mobile loyalty system and method are possible and contemplated. All changes, modifications, variations, and other uses and applications which do not depart from the spirit and scope of the disclosure are deemed to be covered by the disclosure, which is limited only by the claims which follow.

What is claimed is:

1. A mobile loyalty system for preventing fraudulent redemption of a reward comprising:
    a code displayed at a merchant location and representative of a visit to the merchant location;
    a loyalty server system for storing information of a listing of rewards being offered by the merchant location and an indication of when the rewards will expire in a plurality of network based non-transitory storage devices;
    a mobile communication device having a screen, a camera, and configured to run a mobile application for obtaining the displayed code representative of the visit to the merchant location, the camera for obtaining the displayed code representative of the visit to the merchant location, the mobile application for transmitting information associated with obtaining the displayed code representative of the visit to the merchant location to the loyalty server system and for receiving information from the loyalty server system associated with one of the rewards to be redeemed at the merchant location based upon obtaining the displayed code representative of the visit to the merchant location and the indication as to when the reward will expire, the screen for displaying the reward to be redeemed, a fraud protection device display element displayed in a transitory format in the screen for preventing fraudulent redemption of the reward with the fraud protection device display element being based on the indication received from the loyalty service system, and an icon separate from the displayed reward to be redeemed and the fraud protection device display element, the icon capable of being selected by pressing the icon on the screen of the mobile communication device with selection of the icon indicating that the reward has been redeemed and for disabling the transitory format of the fraud protection device display element, the mobile communication device for providing remote access to a user over a network so the user can update the information about the visits to the merchant location in real time through a graphical user interface;
    a storage device for storing the updated information about the visit to the merchant location; and
    the loyalty server system for automatically generating a message containing the updated information about the reward whenever updated information has been stored and for transmitting the message to the user over the network in real time so that the user has immediate access to up-to-date information regarding the reward.

2. The mobile loyalty system of claim 1 wherein the fraud protection device display element is a count down timer display.

3. The mobile loyalty system of claim 1 wherein the transitory format of the fraud protection device display element is the fraud protection device display element blinking a predetermined sequence.

4. The mobile loyalty system of claim 1 wherein the transitory format of the fraud protection device display element is moving, flashing, or blinking in a random sequence.

5. The mobile loyalty system of claim 1 wherein the transitory format of the fraud protection device display element is the fraud protection device display element moving, flashing, or blinking in a predetermined sequence.

6. The mobile loyalty system of claim 1 wherein the transitory format of the fraud protection device display element is the fraud protection device display element flashing in a predetermined sequence.

7. The mobile loyalty system of claim 1 wherein the screen further comprises a box in which the reward is displayed.

8. The mobile loyalty system of claim 1 wherein the fraud protection device display element is active for a predetermined period of time.

9. A mobile loyalty system for preventing fraudulent redemption of a reward comprising:
    a code displayed at a grouping of merchant locations and representative of a visit to one of the merchant locations within the grouping of merchant locations;
    a loyalty server system for storing information of a listing of rewards being offered by the grouping of merchant locations and an indication of when the rewards will expire in a plurality of network based non-transitory storage devices;
    a mobile communication device having a screen, a camera, and configured to run a mobile application for obtaining the displayed code representative of the visit to one of the merchant locations within the grouping of merchant locations, the camera for obtaining the displayed code representative of the visit to one of the merchants within the grouping of merchants, the mobile application for transmitting information associated with obtaining the displayed code representative of the visit to one of the merchants within the grouping of merchants to the loyalty server system and for receiving information from the loyalty server system associated with one of the rewards to be redeemed at any of the merchants within the grouping of merchants based upon obtaining the displayed code representative of the visit to one of the merchants within the grouping of merchants and the indication as to when the reward will expire, the screen for displaying the reward to be redeemed, a fraud protection device display element displayed in a transitory format in the screen for preventing fraudulent redemption of the reward with the fraud protection device display element being based on the indication received from the loyalty service system, and an icon separate from the displayed reward to be redeemed and the fraud protection device display element, the icon capable of being selected by pressing the icon on the screen of the mobile communication device with selection of the icon indicating that the reward has been redeemed and for disabling the transitory format of the fraud protection device display element, the mobile communication device for providing remote access to a user over a network so the user can update the information about the visits to to one of the merchant locations within the grouping of merchant locations in real time through a graphical user interface;

a storage device for storing the updated information about the visit to one of the merchant locations within the grouping of merchant locations; and the loyalty server system for automatically generating a message containing the updated information about the reward whenever updated information has been stored and for transmitting the message to the user over the network in real time so that the user has immediate access to up-to-date information regarding the reward.

10. The mobile loyalty system of claim 9 wherein the transitory format of the fraud protection device display element is a predetermined sequence.

11. The mobile loyalty system of claim 9 wherein the transitory format of the fraud protection device display element is a random sequence.

12. The mobile loyalty system of claim 9 wherein the transitory format of the fraud protection device display element is a blinking predetermined sequence.

13. The mobile loyalty system of claim 9 wherein the transitory format of the fraud protection device display element is a flashing predetermined sequence.

14. The mobile loyalty system of claim 9 wherein the fraud protection device display element is active for a predetermined period of time.

15. The mobile loyalty system of claim 9 wherein the fraud protection device display element is active for a predetermined period of time and when the predetermined period of time has expired the fraud protection device display element is disabled.

16. A mobile loyalty system for preventing fraudulent redemption of a reward comprising:

a code displayed at a merchant location and representative of a visit to the merchant location;

a loyalty server system for storing information of a listing of rewards being offered by the merchant location and an indication of when the rewards will expire in a plurality of network based non-transitory storage devices;

a mobile communication device having a screen, a camera, and configured to run a mobile application for obtaining the displayed code representative of the visit to the merchant, the camera for obtaining the displayed code representative of the visit to the merchant, the mobile application for transmitting information associated with obtaining the displayed code representative of the visit to the merchant to the loyalty server system and for receiving information from the loyalty server system associated with the reward to be redeemed at the merchant based upon obtaining the displayed code representative of the visit to the merchant and the indication as to when the reward will expire, the screen for displaying the reward to be redeemed, a fraud protection device display element displayed in a transitory format in the screen for preventing fraudulent redemption of the reward with the fraud protection device display element being based on the indication received from the loyalty server system, and an icon separate from the displayed reward to be redeemed and the fraud protection device display element, the icon capable of being selected by pressing the icon on the screen of the mobile communication device with selection of the icon indicating that the reward has been redeemed and for disabling the transitory format of the fraud protection device display element, and the application for disabling transmitting information associated with obtaining the displayed code representative of the visit to the merchant during a predetermined time period, the mobile communication device for providing remote access to a user over a network so the user can update the information about the visits to the merchant location in real time through a graphical user interface;

a storage device for storing the updated information about the visit to the merchant location; and the loyalty server system for automatically generating a message containing the updated information about the reward whenever updated information has been stored and for transmitting the message to the user over the network in real time so that the user has immediate access to up-to-date information regarding the reward.

17. The mobile loyalty system of claim 16 wherein the predetermined time period is a day.

18. The mobile loyalty system of claim 16 wherein the predetermined time period is a number of hours.

19. The mobile loyalty system of claim 16 wherein the application further disables transmitting information associated with obtaining the displayed code representative of the visit to the merchant during a predetermined number of visits to the merchant.

20. The mobile loyalty system of claim 16 wherein the transitory format of the fraud protection device display element is a random sequence.

* * * * *